United States Patent
Morozov et al.

(10) Patent No.: US 12,019,260 B2
(45) Date of Patent: *Jun. 25, 2024

(54) BEAM EXPANDER AND METHOD OF OPERATING THE SAME

(71) Applicant: SAMSUNG ELECTRONICS CO., LTD., Suwon-si (KR)

(72) Inventors: Aleksander V. Morozov, Moscow (RU); Andrey N. Putilin, Moscow (RU); Sergey E. Dubynin, Moscow (RU); Chilsung Choi, Suwon-si (KR); German B. Dubinin, Moscow (RU); Hongseok Lee, Suwon-si (KR); Hoon Song, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,673

(22) Filed: Apr. 19, 2023

(65) Prior Publication Data

US 2023/0251410 A1  Aug. 10, 2023

Related U.S. Application Data

(63) Continuation of application No. 17/369,103, filed on Jul. 7, 2021, now Pat. No. 11,662,511.

(30) Foreign Application Priority Data

Jul. 22, 2020 (RU) ................................ 2020124347
Feb. 1, 2021 (KR) ........................ 10-2021-0014402

(51) Int. Cl.
*F21V 8/00* (2006.01)
*G02B 5/32* (2006.01)
(Continued)

(52) U.S. Cl.
CPC ............ *G02B 6/0025* (2013.01); *G02B 5/32* (2013.01); *G02B 27/0944* (2013.01); *G02B 27/425* (2013.01)

(58) Field of Classification Search
None
See application file for complete search history.

(56) References Cited

U.S. PATENT DOCUMENTS 5,292,620 A  3/1994 Booth et al.
5,436,759 A  7/1995 Dijaili et al.
(Continued)

FOREIGN PATENT DOCUMENTS

CN  1424829 A  6/2003
CN  103620498 A  3/2014
(Continued)

OTHER PUBLICATIONS

Communication dated Dec. 22, 2021 issued by the European Patent Office in application No. 21186447.5.
(Continued)

*Primary Examiner* — Elmito Breval
(74) *Attorney, Agent, or Firm* — Sughrue Mion, PLLC

(57) ABSTRACT

A beam expander includes first and second optical elements spaced apart from each other, and a light diffuser having an angular aperture that diffuses incident light through the angular aperture, wherein the first optical element in-couples the diffused light such that light exiting the first optical element has a first cross-sectional shape and light having a second cross-sectional shape different from the first cross-sectional shape is incident on the second optical element, and the second optical element out-couples light incident from the first optical element.

20 Claims, 5 Drawing Sheets

(51) Int. Cl.
*G02B 27/09* (2006.01)
*G02B 27/42* (2006.01)

(56) References Cited

U.S. PATENT DOCUMENTS

| | | | |
|---|---|---|---|
| 5,920,409 A | 7/1999 | Chadi et al. | |
| 6,154,480 A | 11/2000 | Magnusson et al. | |
| 7,511,805 B2 | 3/2009 | Hinderling et al. | |
| 8,115,992 B2 | 2/2012 | Brueck et al. | |
| 8,187,771 B2 | 5/2012 | Staub et al. | |
| 8,427,725 B2 | 4/2013 | Futterer et al. | |
| 8,526,105 B2 | 9/2013 | Brueck et al. | |
| 8,711,466 B2 | 4/2014 | Kroll et al. | |
| 9,152,040 B1 | 10/2015 | Brueck et al. | |
| 9,188,740 B1 | 11/2015 | Nomura | |
| 9,239,455 B2 | 1/2016 | Brueck et al. | |
| 9,395,690 B2 | 7/2016 | Futterer | |
| 9,464,779 B2 | 10/2016 | Popovich et al. | |
| 9,541,374 B2 | 1/2017 | Brueck et al. | |
| 9,709,810 B2 | 7/2017 | Karlsen et al. | |
| 10,025,093 B2 | 7/2018 | Wall et al. | |
| 10,061,194 B1 | 8/2018 | Brueck et al. | |
| 10,295,959 B2 | 5/2019 | Futterer | |
| 10,935,806 B2 | 3/2021 | Schowengerdt | |
| 11,087,555 B2 | 8/2021 | Miller et al. | |
| 2002/0076154 A1 | 6/2002 | Maisenhoelder et al. | |
| 2003/0100824 A1 | 5/2003 | Warren et al. | |
| 2003/0138208 A1 | 7/2003 | Pawlak et al. | |
| 2003/0210467 A1 | 11/2003 | Song | |
| 2004/0130790 A1 | 7/2004 | Sales | |
| 2004/0253365 A1 | 12/2004 | Warren et al. | |
| 2005/0237493 A1 | 10/2005 | Tajiri | |
| 2006/0008206 A1 | 1/2006 | Maisenhoelder et al. | |
| 2006/0115213 A1 | 6/2006 | Maeda et al. | |
| 2007/0103747 A1 | 5/2007 | Powell et al. | |
| 2007/0121101 A1 | 5/2007 | Hinderling et al. | |
| 2007/0147065 A1 | 6/2007 | Nagata | |
| 2010/0277779 A1 | 11/2010 | Futterer et al. | |
| 2012/0105618 A1 | 5/2012 | Brueck et al. | |
| 2012/0211591 A1 | 8/2012 | Sandomirsky et al. | |
| 2013/0004887 A1 | 1/2013 | Naik et al. | |
| 2013/0094077 A1 | 4/2013 | Brueck et al. | |
| 2014/0098342 A1 | 4/2014 | Webb | |
| 2015/0107650 A1 | 4/2015 | Bodan et al. | |
| 2015/0160529 A1 | 6/2015 | Popovich et al. | |
| 2015/0219905 A1 | 8/2015 | Karlsen et al. | |
| 2015/0338576 A1 | 11/2015 | Nomura | |
| 2016/0161731 A1 | 6/2016 | Brueck et al. | |
| 2017/0219841 A1 | 8/2017 | Popovich et al. | |
| 2017/0299875 A1 | 10/2017 | Karlsen et al. | |
| 2019/0086598 A1 | 3/2019 | Futterer | |
| 2019/0391375 A1 | 12/2019 | Fahrbach | |
| 2020/0081255 A1 | 3/2020 | Schultz et al. | |

FOREIGN PATENT DOCUMENTS

| | | |
|---|---|---|
| CN | 104820286 A | 8/2015 |
| CN | 105934902 A | 9/2016 |
| EP | 0 324 493 A2 | 7/1989 |
| EP | 0 324 493 B1 | 11/1996 |
| EP | 1 612 596 A1 | 1/2006 |
| EP | 2 002 310 B1 | 11/2017 |
| KR | 10-2003-0088218 A | 11/2003 |
| RU | 2 130 632 C1 | 5/1999 |
| RU | 163 233 U1 | 7/2016 |
| WO | 02/38447 A2 | 5/2002 |
| WO | 03/017745 A2 | 3/2003 |
| WO | 2007/072335 A2 | 6/2007 |
| WO | 2009/050294 A2 | 4/2009 |
| WO | 2010/009908 A1 | 1/2010 |
| WO | 2017/158073 A1 | 9/2017 |
| WO | 2018/224847 A2 | 12/2018 |

OTHER PUBLICATIONS

Communication dated Feb. 15, 2021 issued by the Russian Intellectual Property Office in counterpart Russian Application No. 2020124347.
Search Report dated Feb. 12, 2021 issued by the Russian Intellectual Property Office in counterpart Russian Application No. 2020124347.
Communication dated May 20, 2021 issued by the Russian Intellectual Property Office in counterpart Russian Application No. 2020124347.

BEAM EXPANDER AND METHOD OF OPERATING THE SAME

CROSS-REFERENCE TO RELATED APPLICATIONS

This is a continuation application of U.S. patent application Ser. No. 17/369,103, filed Jul. 7, 2021, in the US Patent and Trademark Office, which application is based on and claims priority under 35 U.S.C. § 119 to Russian Patent Application No. 2020124347, filed on Jul. 22, 2020, in the Russian Patent Office and Korean Patent Application No. 10-2021-0014402, filed on Feb. 1, 2021, in the Korean Intellectual Property Office, the disclosures of which are incorporated by reference herein in their entireties.

BACKGROUND

1. Field

The disclosure relates to the field of optical systems, and more particularly, to beam expanders used for illumination in three-dimensional (3D) images (e.g., 3D displays, holographic displays, etc.).

2. Description of Related Art

In optical systems, and in particular in holographic imaging and display systems, beam expanders, which are optical devices that generally receive collimated light and expand its dimensions, may be used.

Among the requirements for holographic display devices currently under development, as well as configuration systems for illumination and beam expansion, the main requirements are minimizing the sizes of the devices, increasing the efficiency of homogenization, providing a light beam having a certain cross-sectional shape (aperture), and removing speckles.

Here, "speckles" are random interference patterns that are formed by mutual interference of coherent waves with random phase shifts and/or a random set of intensities.

The requirements for holographic display devices, as well as configuration systems for illumination, beam expansion, and collimation are beam shaping with a required cross-sectional shape and size (aperture) and homogenization, and efficient suppression of laser beam speckles while retaining coherence of output light.

However, optical systems with beam expanders generally have the following problems.

1) Uniformity of Light Beam

A light beam expanded by a conventional high-efficiency beam expander provides limited possibilities in terms of retaining the coherence of a laser beam and ensuring high uniformity.

2) Beam Cross-Section (Aperture) Shaping

Given that at the input end of the beam expander the light beam has circular or elliptical symmetry, it is not possible to ensure the light beam uniformity and the beam cross-section shaping (shaping the light beam as required) while retaining high efficiency of a system, e.g., without significant energy losses.

3) Reduction of Speckles

The use of coherent laser light may result in speckles and speckle patterns, which are generated due to random interference.

SUMMARY

Example embodiments have been made taking into account the drawbacks of the above prior art solutions and may aim at eliminating or at least reducing the drawbacks of the prior art.

Example embodiments provide coherent light beam homogeneity, as well as provide a required cross-sectional shaping and a reduction or suppression of speckles, while retaining the coherence of an output light beam.

Additional aspects will be set forth in part in the description which follows and, in part, will be apparent from the description, or may be learned by practice of embodiments of the disclosure.

In accordance with an aspect of the disclosure, a beam expander includes a first optical element; a second optical element spaced apart from the first optical element; and a light diffuser having an angular aperture, the light diffuser diffusing incident light through the angular aperture, wherein the first optical element in-couples the diffused light such that light exiting the first optical element has a first cross-sectional shape and light having a second cross-sectional shape different from the first cross-sectional shape is incident on the second optical element, and wherein the second optical element out-couples light incident from the first optical element.

The angular aperture of the light diffuser may be greater than about 0° and equal to or less than 5°.

An intensity of the light diffused by the light diffuser may have a greater uniformity over a light cross section than an intensity of the incident light.

The light diffuser may output the incident light as a plurality of sub-lights that are spatially separated from each other.

The light diffuser may modulate a phase of the incident light and outputs the incident light as a plurality of sub-lights.

The light diffuser may perform spatial non-uniformity phase modulation on the incident light and outputs a plurality of sub-lights.

The light diffuser may further include at least one of a microlens raster, a phase mask, a matte diffuser, a diffractive optical element, and a holographic optical element.

The second cross-sectional shape may be a polygonal shape.

The first cross-sectional shape may be a circle or an ellipse.

A size of the second cross-sectional shape may be less than a size of the first cross-sectional shape.

The incident light may have an optical cross-sectional profile of at least one of a Gaussian beam, a multimode beam, a cylindrical beam, a super-Gaussian beam, and a Laguerre-Gaussian beam.

At least one of the first optical element and the second optical element may include at least one of a diffractive optical element and a holographic optical element.

The beam expander may further include a waveguide arranged on the first optical element and the second optical element, the waveguide gradually transforming the light having the first cross-sectional shape from the first optical element into the light having the second cross-sectional shape through total internal reflection and directing the transformed light to the second optical element.

The waveguide may gradually reduce a size of the first cross-sectional shape through total internal reflection to transform the light having the first cross-sectional shape into the light having the second cross-sectional shape.

The light diffuser and the first optical element may be arranged to overlap each other in a direction perpendicular to a length direction of the waveguide.

The light diffuser may be arranged on a first surface of the waveguide, and the first optical element may be arranged on a second surface opposite to the first surface of the waveguide.

The light diffuser may be integrated with the first optical element.

The beam expander may further include a laser diode that provides the incident light.

The second optical element may colimate, at a divergence or convergence angle of less than 0.25°, light incident on the second optical element.

A uniformity of an intensity of the light out-coupled by the second optical element may be greater than a uniformity of an intensity of the light incident on the light diffuser.

In accordance with an aspect of the disclosure, a method of operating a beam expander includes diffusing incident light with a light diffuser; changing the diffused light having a first cross-sectional shape into light having a second cross-sectional shape different from the first cross-sectional shape while propagating the diffused light through a waveguide; and collimating the light having the second cross-sectional shape with an optical element.

In accordance with an aspect of the disclosure, a beam expander includes a waveguide; an input optical element that receives incident light and outputs first light having a first cross-sectional shape to the waveguide; and an output optical element that receives light transmitted by the waveguide and outputs second light having a second cross-sectional shape different from the first cross-sectional shape.

A uniformity of a cross-sectional intensity distribution of the first light is greater than a uniformity of a cross-sectional intensity distribution of the incident light.

The input optical element may include a diffuser that diffuses the incident light and at least one of a diffractive optical element (DOE) and a holographic optical element (HOE).

The diffuser may be integrated with the at least one of the DOE and the HOE.

The first cross-sectional shape may be at least one of an ellipse and a circle, and the second cross-sectional shape may be a rectangle.

The second cross-sectional shape may be the same as a cross-sectional shape of the output optical element.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
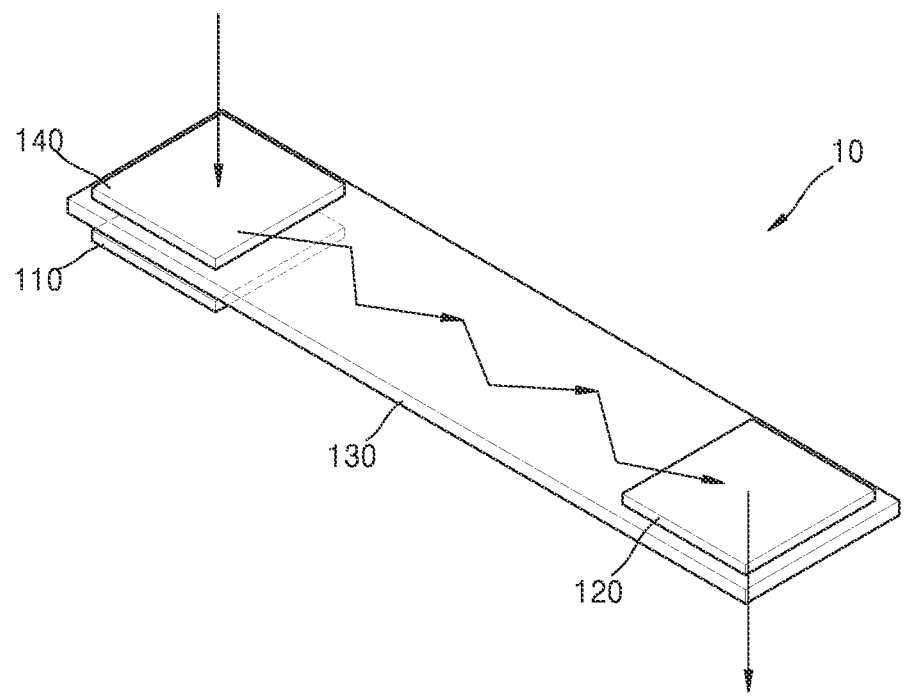
FIG. 1 is a diagram illustrating a beam expander according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings. In the drawings, the same reference numerals represent the same elements, and a size of each element may be exaggerated for clarity and convenience of description. Embodiments described below are merely examples and various modifications may be made therein.

As used herein, the term "on" or "above" an element may be understood to mean that the element may be directly on another element or the element may be on another element not in contact with the other element.

As used herein, the singular expressions are intended to include plural forms as well, unless the context clearly dictates otherwise. It will be understood that when an element is referred to as "including" another element, the element may further include other elements unless mentioned otherwise.

The term "the" and demonstratives similar thereto may be understood to include both singular and plural forms.

Terms such as "first" and "second" may be used to describe various elements, but the elements should not be limited by the terms. The terms are used only for the purpose of distinguishing one element from another element.

FIG. 1 is a diagram illustrating a beam expander 10 according to an embodiment.

A light source may provide light to a beam expander 10. The light source may include a laser diode. In an embodiment, the laser diode as a light source may be arranged external to the beam expander 10 or may be embedded in the beam expander 10. The laser diode may provide coherent light with a certain intensity distribution.

The light source is not limited to the laser diode. Besides a laser light source, any source with a narrow spectral range, such as a light-emitting diode (LED) or an organic light-emitting diode (OLED), may also be used as a light source. Light sources that may be used in the beam expander 10 according to an embodiment are not limited to a certain light source. In some embodiments, the light source may include a gas discharge lamp capable of generating several narrow spectral lines of light.

An example embodiment is described using a laser beam, which is an external source, as a light source, but is not limited thereto. In addition to the laser beam, other types of coherent or even incoherent light from an external or built-in source may be used as light sources.

In an embodiment, the light source may provide light having various electric fields and light cross-sectional profiles. For example, the light may have a cross-sectional profile of at least one of a Gaussian beam, a multimode beam, a cylindrical beam, a super-Gaussian beam (a beam with an annular cross-section), and a Laguerre-Gaussian beam.

In the coherent light according to an embodiment, a plurality of components may be arranged in a certain distribution in a cross-section. For example, the coherent light may include blue (a wavelength of about 460 nm), red (a wavelength of about 640 nm), and green (a wavelength of about 515 nm). The distribution of the three components of light in the cross-section of the incident light described above may vary for each wavelength. However, the disclosure is not limited thereto.

The beam expander 10 according to an embodiment does not require adjustment of any device to use a certain light source. The above-described light source is a light source that causes light to be incident on the beam expander 10 from the outside of the beam expander 10 and may also be referred to as a primary light source. However, the disclosure is not limited thereto. The beam expander 10 may itself include a light source, and the light source may be controlled by the beam expander 10 itself and the entire system. In some cases, the light source may be an essential element of the beam expander 10.

An example of an implementation of an embodiment using an external light source may provide the use of the light source as an independent device for laboratory stands, in metrology, in devices of the same type for the end user of various manufacturers (monitors and glasses of augmented or virtual reality), etc. An example of an implementation of an embodiment with a built-in light source may provide the use of the light source in user devices of a single manufacturer when unifying elements.

The beam expander 10 according to an embodiment may include a first optical element 110 (e.g., an input optical element) and a second optical element 120 (e.g., an output optical element), each of which may be implemented as a holographic optical element (HOE) or a diffractive optical element (DOE). The first optical element 110 may be an HOE and the second optical element 120 may be a DOE, and vice versa.

The DOE and the HOE are basically based on the same physical principle, and both of these optical elements may be essentially referred to as DOEs. The difference between the two optical elements is that the DOE is an optical element in which diffraction occurs on a surface relief, and the HOE includes a Bragg volumetric grating in which diffraction occurs in a material due to local variation in optical properties.

The purpose of the first optical element 110 is to direct light onto the plane of the second optical element 120 such that it has a certain cross-sectional shape and homogenization when it is incident on the second optical element 120. The purpose of the second optical element 120 is to collimate light having a cross-section formed by the first optical element 110 while keeping the coherence of the light at the output end of the second optical element 120.

The beam expander 10 according to an embodiment may further include a waveguide 130 connecting the first optical element 110 to the second optical element 120. The waveguide 130 may be a substrate or a substrate coated with a thin film. Alternatively, the waveguide 130 may include a substrate and a multilayer film coated on one or both of the surfaces of the substrate. The substrate may be made of any optically transparent material used in the art. Thin-film coatings may be a single-layer or a multi-layer, and may be reflective (specular). In particular, the thin-film coatings may be metallized or may be oxide films. The thin film coatings may be implemented as anti-reflective coatings that selectively and partially transmit a spectrum. The thin film coatings may be formed by spraying or chemical vapor deposition, for example.

The beam expander 10 according to an embodiment may further include a light diffuser 140 (i.e., a diffuser) having a certain angular aperture. The light diffuser 140 may be manufactured as a separate element or an element attached to the surface of the waveguide 130. Alternatively, each of the light diffuser 140 having a certain angular aperture and the first optical element 110 may be arranged on different sides of the waveguide 130 as shown in FIG. 1, and the light diffuser 140 and the first optical element 110 may at least partially overlap each other in a direction perpendicular to a length direction of the waveguide 130. Other arrangement relationships between the light diffuser 140 having a certain angular aperture and the first optical element 110 (input optical grating) may also be easily designed by a person skilled in the art.

The light diffuser 140 having a certain angular aperture according to an embodiment may diffuse light incident from a light source and illuminate the first optical element 110. In the context of embodiments, the term "certain" angular aperture means that the angular aperture of the light diffuser 140 is specially calculated or matched to certain parameters of the optical system and is coordinated with the remaining elements (e.g., the first optical element 110 and the second optical element 120).

In an embodiment, the light diffuser 140 having a certain angular aperture may be implemented in the form of a so-called calculated "phase mask" produced by etching, cutting, casting, or lithography. The "phase mask" may shape the light to diffuse the light as desired. The phase mask may achieve higher efficiency because the coverage of the second optical element 120 with respect to the diffused light is high. The light diffuser 140 having a certain angular aperture in the form of a "phase mask" may be made of any optically transparent material such as plastic, glass, resin, polymer, or photopolymer, but is not limited thereto.

In an embodiment, the light diffuser 140 having a certain angular aperture may be implemented as a microlens array having a periodic or random structure. Because the microlens array has a wide angular range, the microlens array may be somewhat less efficient than a light diffuser that is a "phase mask". Accordingly, the shape of a beam section in the plane of the second optical element 120 may be larger than the size of the second optical element 120 itself.

In an embodiment, the light diffuser 140 having a certain angular aperture may be implemented as a matte diffuser having a surface roughness.

In an embodiment, the light diffuser 140 having a certain angular aperture may be implemented as a DOE or an HOE. When the light diffuser 140 is implemented as a DOE or an HOE, the light diffuser 140 may be a separate element or may be implemented integrally with the first optical element 110. For example, in an embodiment in which the first optical element 110 is implemented having an optical grating structure, the light diffuser 140 having a certain angular aperture may be "recorded" in the optical grating structure. In particular, a light diffuser 140 having a certain angular aperture may be integrated into the first optical element 110 at the "recording" step, which allows the light diffuser 140 having a certain angular aperture to be called a "virtual" diffuser in the context of some embodiments.

The "recording" process of the light diffuser 140 having a certain angular aperture in the optical grating structure implementing the first optical element 110 may be performed by analog type or by digital type.

Analog recording is essentially recording of a result of the interference (interference pattern) between two beams of light (a reference beam and an object beam on a photo material). When the resulting structure is illuminated with one of the beams of light participating in the recording or with light associated therewith, as a result of diffraction, light that is completely identical in all parameters to the light participating in the recording may be restored. In other words, a conventional diffractive grating may essentially be an interference pattern between two collimated beams. When the light diffuser 140 is placed in the beams of the light participating in the recording, the light diffuser 140 may be integrated in the first optical element 110. Thus, when light is illuminated on the first optical element 110, the light may pass through the first optical element 110 in which the light diffuser 140 is integrated, and light having an energy distribution corresponding to the pattern of the light diffuser 140 may be output.

Digital recording is formed by a lithographic or mechanical unit after calculating/simulating the diffractive structure of the first optical element 110.

A method of setting the angular aperture may differ depending on the design type of the light diffuser 140. When the light diffuser 140 is a matte diffuser, the angular aperture may be "set" to a surface roughness, that is, the size of irregularities present on the surface of the light diffuser 140. When the light diffuser 140 is a microlens array (microlens raster), the angular aperture may be "set" by the focal length, size and period of the microlens. When the light diffuser 140 is an HOE or a DOE, or is integrated in the first optical element 110, the angular aperture may be "set" by a diffractive structure included in the optical element.

The light diffuser 140 having a certain angular aperture may be implemented as a separate element arranged in front of the first optical element 110 at regular intervals, and may also be made in the form of an element glued or otherwise adhered to the waveguide 130 or the first optical element 110. In addition, the light diffuser 140 having a certain angular aperture may be implemented on a portion of the surface of the waveguide 130 by mechanical means, chemical means (by etching) or casting.

The above are only examples of the implementation of the light diffuser 140 having a certain angular aperture, which is used in the device according to an embodiment. However, the disclosure is not limited thereto. The selection of an embodiment of the light diffuser 140 with a certain angular aperture may be determined by certain features for the implementation of the device according to an embodiment and/or certain requirements for the device.

Light incident on the light diffuser 140 may be converted into a combination of secondary light sources. The light incident on the light diffuser 140 may be light having a Gaussian distribution, and the combination of the secondary light sources may include pieces of spatially separated sub-light (i.e., a plurality of sub-lights spatially separated from each other). The secondary light sources may have higher light uniformity over a light cross section than the incident light. In other words, an intensity distribution of a cross-section of the secondary light sources may be more uniform than an intensity distribution of the light that is incident on the light diffuser 140.

The mixing quality and homogenization of the light output from the beam expander 10 may be ensured by the density and light pattern (e.g., the cross-sectional shape of light) of light emitted from the combination of secondary light sources and the optical path length of the waveguide 130. In addition, the efficiency of an entire optical system of the proposed device may vary depending on the light pattern of the combination of secondary light sources and the optical path length of the waveguide 130.

The light diffuser 140 may output pieces of sub-light by phase-modulating the incident light. For example, the light diffuser 140 may perform phase modulation of spatial non-homogenization on light. Speckle noise of light diffused by the light diffuser 140 may be thereby reduced.

The light diffuser 140 having a certain angle aperture may multiply incident coherent light and output a result of multiplying as a secondary light source, that is, pieces of sub-light. Each of the pieces of sub-light may form its own speckle pattern while simultaneously forming different speckle patterns. Because the speckle patterns of the pieces of sub-light acquired by the light diffuser 140 having a certain angle aperture overlap each other while passing through the waveguide, the contrast of a combined speckle pattern formed on the second optical element 120 may be significantly reduced. The total contrast of the speckle pattern on the second optical element 120 may decrease by a factor of $\sqrt{n}$, where n is the number of pieces of sub-light output by the light diffuser 140 having a certain angular aperture. In the beam expander 10 according to an embodiment, the implementation of an optical scheme having the light diffuser 140 having a certain angular aperture may reduce the formation of speckles output from the second optical element 120 by up to about 80%.

The light diffuser 140 having a certain angular aperture according to an embodiment may be integrated into the structure of the first optical element 110. This may be realized in the manufacturing of the first optical element 110 and may allow reducing the number of components of the beam expander 10, while providing efficiency similar to that in the previous embodiment described above, because light diffused through the first optical element 110 has a high coverage for the second optical element 120.

In various embodiments, the light diffuser 140 having a certain angular aperture may be made of any material that is optically transparent in the spectral range of the incident light. For example, the light diffuser 140 may include at least one of plastic, glass, resin, polymer, and photopolymer, and may be in one or more of the following forms, but is not limited thereto.

A separate element;

An element attached on the surface of the waveguide 130 or formed as a part of the surface of the waveguide 130;

An element combined with the first optical element 110 (input optical grating);

An element with a certain surface relief;

A reflective or transmissive DOE (relief optical element or volume Bragg grating)

In various embodiments, the first optical element 110 (input optical grating) may be made of any material that is optically transparent in the spectral range of incident light. For example, the first optical element 110 may include at least one of plastic, glass, resin, polymer, and photopolymer, and may be in one or more of the following forms, but is not limited thereto.

A separate element;

An element attached on the surface of the waveguide 130 or formed as a part of the surface of the waveguide 130;

An element combined with the light diffuser 140 having a certain angular aperture;

A reflective or transmissive DOE (relief optical element or volume Bragg grating)

The second optical element 120 (output optical grating) may also be made of any material that is optically transparent in the spectral range of the incident light. The second optical element 120 may include at least one of plastic, glass, resin, polymer, and photopolymer, and may be implemented in one or more of the following forms, but is not limited thereto.

A separate element;

An element attached on the surface of the waveguide 130 or formed as a part of the surface of the waveguide 130;

A reflective or transmissive DOE (relief optical element or volume Bragg grating)

The light diffuser 140 having a certain angle aperture may diffuse incident light and output pieces of sub-light. The light diffuser 140 having a certain angular aperture may increase the degree of uniformity of intensity of light by converting Gaussian light into light having the same intensity distribution, regardless of the coordinates in the light cross-section, and may provide the reduction of speckles.

The first optical element 110 may in-couple diffused light, that is, pieces of sub-light, to the waveguide 130. The first optical element 110 may be designed such that a light spot having a certain cross-section is formed on the plane of the second optical element 120.

Light diffused through the waveguide 130 may be transmitted from the first optical element 110 to the second optical element 120. Due to the fact that the diffused light may be mixed up while propagating through the waveguide 130, the waveguide 130 (converting Gaussian light into light having a constant intensity distribution regardless of the coordinates in a beam cross-section) may ensure homogenization of light and contribute to speckle suppression.

Light traveling through the waveguide 130 by total internal reflection may be incident on the second optical element 120, and the second optical element 120 may collimate each sub-light formed by the light diffuser 140 having a certain angular aperture and combine all the pieces of sub-light into one spot having a required shape.

The light traveling through the waveguide 130 may be diffracted by the second optical element 120 and then out-coupled from the waveguide 130. The second optical element 120 may be designed to collimate light arriving through the waveguide 130 and to give the collimated light a required cross-sectional shape. Thus, the out-coupled light may have a required degree of collimation and a required cross-sectional shape.

The cross-sectional shape of the light incident on the second optical element 120 may be based on the design of at least one of the light diffuser 140 having a certain angular aperture, the first optical element 110, the waveguide 130, and the second optical element 120. At the output end of the second optical element 120, light may have a high level of collimation and uniformity and may have a certain cross-sectional shape with a low speckle contrast.

Preferably, light on the plane of the second optical element 120 may have a shape and a cross-sectional dimension each substantially corresponding to the shape and dimension of the second optical element 120. That is, light may substantially completely cover the plane of the second optical element 120 without exceeding the limit of the second optical element 120. This may ensure high lighting efficiency by collimated output light.

The second optical element 120 may collimate incident light in one direction and output the collimated light. However, the disclosure is not limited thereto. The second optical element 120 may output light having a required cross-sectional shape at a divergence or convergence angle of less than 0.25°. That is, the light output from the second optical element 120 may not be strictly collimated and may be slightly diverged or converged, and the size of light at a considerable distance away from the second optical element 120 may have a cross-sectional dimension that is different from the dimension of light at the output end of the second optical element 120. That is, at the output end and at a considerable distance from the beam expander 10, light may not be of a cylinder type, but may be of a cone type having a dimension of about 0.25° or about 15 arc minutes.

The beam expander 10 according to an embodiment may provide light having high uniformity to an optical system following the beam expander 10. Thus, even when light sources having different intensity profiles are used, the beam expander 10 may provide uniform light, and various types of light sources may be used.

The beam expander 10 according to an embodiment may output light that is uniform, has a shape of a certain cross-section, and maintains spatial coherence, even though light from various sources is incident on the input end of the beam expander 10. In addition, as mentioned above, the beam expander 10 may provide a speckle suppression effect for light. In addition, the beam expander 10 may provide an improved color gamut and improved polarization characteristics of a formed image to form a very realistic 3D image.

Figure 2:
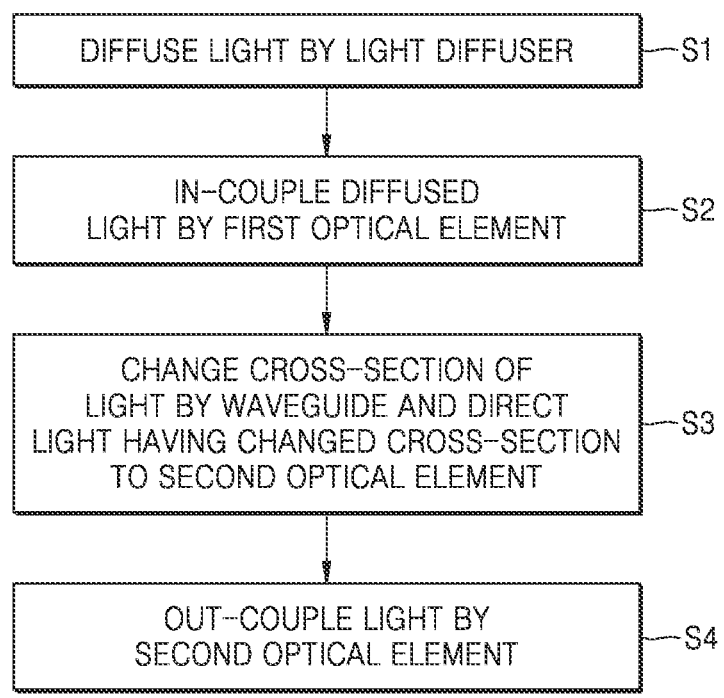
FIG. 2 is a flowchart illustrating a method of expanding coherent light, according to an embodiment.

FIG. 2 is a flowchart illustrating a method of expanding coherent light, according to an embodiment. The method may be implemented by the beam expander 10 that is a coherent beam expander according to an embodiment.

In operation S1, incident coherent light may be diffused by the light diffuser 140 having a certain angular aperture and may then be incident on the first optical element 110. The cross-section of the incident light may not be spatially uniform. For example, the light may have a light cross-sectional profile of at least one of a Gaussian beam, a multimode beam, a cylindrical beam, a super-Gaussian beam, and a Laguerre-Gaussian beam.

Figure 3:
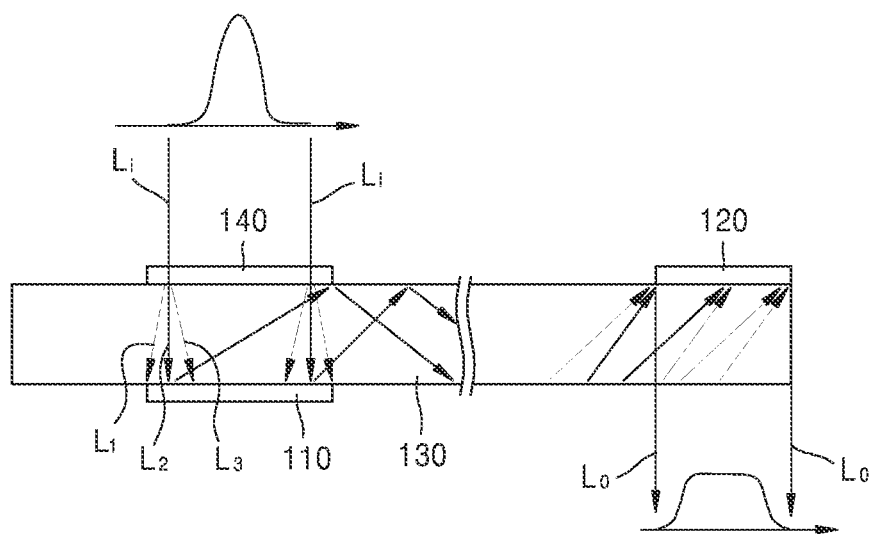
FIG. 3 is a diagram illustrating a travelling path of light in a beam expander according to an embodiment.

FIG. 3 is a diagram illustrating a travelling path of light in the beam expander 10 according to an embodiment. As shown in FIG. 3, the light diffuser 140 having a certain angle aperture may multiply incident coherent light Li and output pieces of sub-light $L_1$, $L_2$, and $L_3$ that are spatially separated. The light diffuser 140 may modulate the phase of the incident coherent light Li and output pieces of sub-light $L_1$, $L_2$, and $L_3$. For example, the light diffuser 140 may perform spatial non-uniformity phase modulation on the incident coherent light Li and output pieces of sub-light $L_1$, $L_2$, and $L_3$.

The light diffuser 140 may include at least one of a microlens raster, a phase mask, a matte diffuser, a DOE, and an HOE. The light diffuser 140 may have an angular aperture that is greater than about 0° and equal to or less than 5°, and a method of setting the angular aperture may vary depending on the type of the light diffuser 140.

In operation S2, diffused light may be in-coupled by the first optical element 110 and travel to the waveguide 130. The first optical element 110 may serve as a coupling element for in-coupling incident light to the waveguide 130 and as a lens for focusing light on the plane of the second optical element 120.

The first optical element 110 may in-couple light diffused by the light diffuser 140, that is, pieces of sub-light $L_1$, $L_2$, and $L_3$, and accordingly, the diffused light may be incident on the second optical element 120 as light having a certain cross-section.

The first optical element 110 may include at least one of a DOE and an HOE. The structure of the surface relief or the volume Bragg grating of the first optical element 110 may be designed such that a cross section of light output from the first optical element 110 and a cross section of light incident on the second optical element 120 are different from each other. For example, the cross-section of light output from the first optical element 110, that is, a combination of pieces of sub-light $L_1$, $L_2$, and $L_3$, may be circular or elliptical. In addition, the cross-section of light $L_0$ incident on the second optical element 120 may have a polygonal shape such as a quadrangle.

As shown in operations S1 and S2 of FIG. 2, the light incident on the beam expander 10 is diffused and then in-coupled. However, the disclosure is not limited thereto. When the light diffuser 140 and the first optical element 110 are implemented as a single optical element, light incident on the beam expander 10 may be diffused and in-coupled at the same time.

In operation S3, light in-coupled by the first optical element 110, that is, pieces of sub-light $L_1$, $L_2$, and $L_3$, may be directed to the second optical element 120 through total internal reflection in the waveguide 130. The pieces of sub-light $L_1$, $L_2$, and $L_3$ have different speckle patterns. However, because a plurality of speckle patterns overlap during total reflection in the waveguide 130, the contrast of the entire speckle pattern decreases. The decrease in the contrast of the speckle pattern may be proportional to the number of pieces of sub-light $L_1$, $L_2$, and $L_3$ separated by the light diffuser 140 and may be proportional to the length of the waveguide 130.

Figure 4:
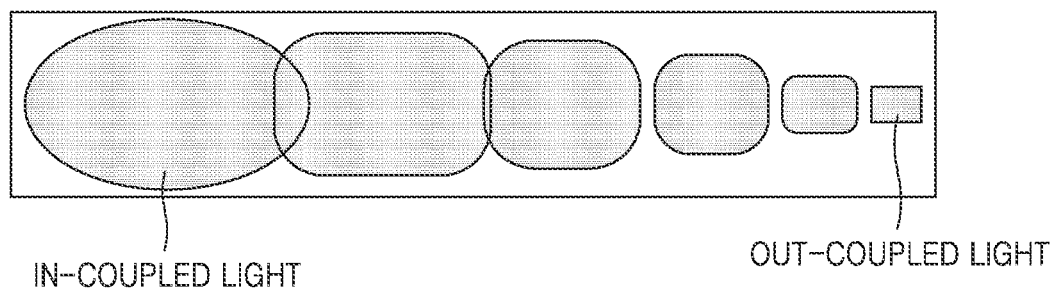
FIG. 4 is a diagram illustrating a cross-section of light in a waveguide according to an embodiment.

FIG. 4 is a diagram illustrating a cross-section of light in the waveguide 130 according to an embodiment. As shown in FIG. 4, the cross-section of in-coupled light may be elliptical. However, the cross-section of the in-coupled light may gradually change into a rectangular cross-section as the in-coupled light travels through total internal reflection in the waveguide 130. The change in the cross-section of light as described above is based on the structure of the surface relief of the first optical element 110 or the design of the volume Bragg grating of the first optical element 110, and the change in the cross-section of the light may change a speckle pattern corresponding to each sub-light and reduce the contrast of the entire speckle pattern.

In addition, the pieces of sub-light $L_1$, $L_2$, and $L_3$ incident on the waveguide 130 may be mixed with each other while propagating through total internal reflection in the waveguide 130 and further increase light uniformity.

In addition, the size of the cross-section of the combination of pieces of sub-light $L_1$, $L_2$, and $L_3$ traveling through the waveguide 130 may gradually decrease as the pieces of sub-light $L_1$, $L_2$, and $L_3$ travel through the waveguide 130. The change in the size of light as described above may be based on the structure of the surface relief of the first optical element 110 or the volume Bragg grating of the first optical element 110, and on the design of the waveguide 130. However, the disclosure is not limited thereto. The size of the cross-section of the combination of pieces of sub-light $L_1$, $L_2$, and $L_3$ traveling through the waveguide 130 may gradually increase as the pieces of sub-light $L_1$, $L_2$, and $L_3$ travel through the waveguide 130. The degree of a change in the size may be adjusted according to the structure of the surface relief of the first optical element 110 or the volume Bragg grating of the first optical element 110, and on the design of the waveguide.

In operation S4 of FIG. 2, light may be incident on the second optical element 120 while maintaining optical coherence and out-coupled from the waveguide 130 by the second optical element 120. Collimation of light in the second optical element 120 may be realized due to diffraction of light in the second optical element 120. The second optical element 120 may collimate incident light in one direction and output collimated light. However, the disclosure is not limited thereto. The second optical element 120 may output light having a required cross-sectional shape at a divergence or convergence angle of less than 0.25°. That is, the light output from the second optical element 120 may not be strictly collimated and may be slightly diverged or converged, and the size of light at a considerable distance away from the beam expander 10 may have a dimension that is different from the dimension of light at the output end of the second optical element 120.

In order to achieve collimation of light, the second optical element 120 may be manufactured as a surface relief structure after calculation, or may be obtained by recording a volume Bragg grating structure as a result of interference between two beams. Here, the two beams may include a perfectly collimated reference beam that is sequentially restored, and an object beam that is the same as a beam traveling along each of the light diffuser 140 having a certain angular aperture, the first optical element 110, and the waveguide 130.

To check light uniformity, the first optical element 110 and the second optical element 120 are made in the form of a volume Bragg grating, the waveguide 130 is a flat glass plate, and the light diffuser 140 uses a matte diffuser having an angular aperture of 5°. A semiconductor laser diode emits light having a diameter of about 2 mm and a Gaussian energy distribution to the light diffuser 140.

Figure 5:
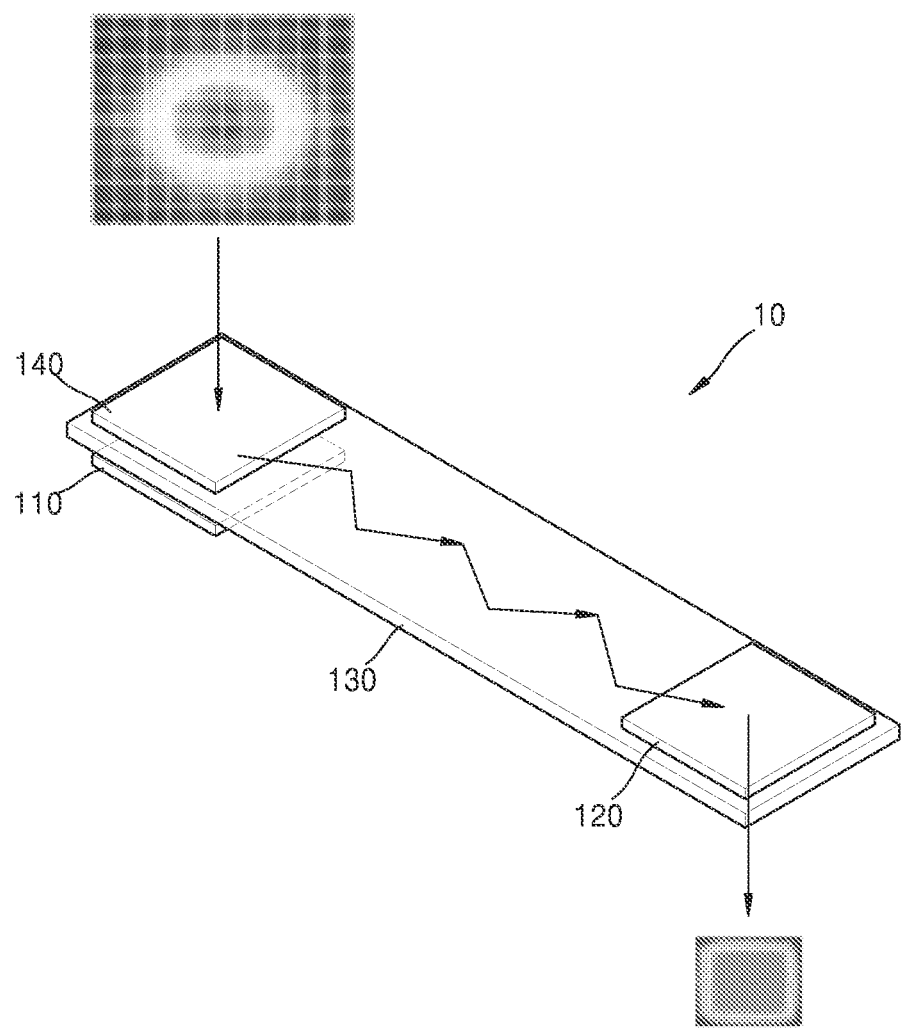
FIG. 5 is a diagram illustrating a cross-section of light output from a beam expander according to an embodiment.

FIG. 5 is a diagram illustrating a cross-section of light output from a beam expander 10 according to an embodiment. As shown in FIG. 5, light incident from a semiconductor laser diode may pass through a light diffuser 140, a first optical element 110, a waveguide 130, and a second optical element 120 and be converted into a beam having a square cross-section of about 5×5 mm$^2$. Light output from the beam expander 10 may have a uniformity of 80% or more.

In an embodiment, the first optical element 110 and the second optical element 120 may be manufactured in the form of a volume Bragg grating, the waveguide 130 may be a flat glass plate, and a microlens array having a focus of about 500 μm, a period of about 500 μm, and a 20×20 lens size may be used as the light diffuser 140. In this embodiment, a collimated beam from a semiconductor laser diode having a diameter of about 2 mm and a Gaussian energy distribution may also be converted to a uniform beam (80% or more) having a square cross-section of about 5×5 mm$^2$.

In an embodiment, the first optical element 110 and the second optical element 120 may be manufactured in the form of a volume Bragg grating, the waveguide 130 may be a flat glass plate, and the light diffuser 140 may be integrated into the first optical element 110 in a recording operation and use a matte diffuser having an angular aperture of about 5°. In this embodiment, a collimated beam from a semiconductor laser diode having a diameter of about 2 mm and a Gaussian energy distribution may be converted to a uniform beam (80% or more) having a square cross-section of about 5×5 mm$^2$. In an embodiment, it is not necessary to completely match the matte diffuser with the first optical element 110. In light output from the beam expander 10, noise in the form of blooming/halo light may be reduced.

Light output from the second optical element 120 may be transmitted, for transmission or conversion, to an external device such as a redirector such as a lens or a mirror, but the external device is not limited thereto. In an embodiment, light out-coupled in the second optical element 120 may directly illuminate a screen, a liquid crystal display (LCD) panel, or imaging matrices.

The beam expander 10 according to an embodiment and a method of operating the beam expander 10 may be used as an illumination element for forming a holographic and/or another three-dimensional image in various fields of application. As a non-limiting example, the beam expander 10 may be used in various display devices such as monitors and TV sets. Example embodiments may be used to form an image in an augmented or virtual reality (AR/VR) system for various applications, a helmet-mounted display device, an indicator on a vehicle windshield, a system that projects information on a vehicle windshield, and a fingerprint scanner. These fields of application of example embodiments are for illustrative purposes only and do not limit the scope of example embodiments. Many other uses of example embodiments will be apparent to those skilled in the art.

The beam expander 10 has been described with reference to example embodiments shown in the drawings. However, this is only an example, and those of ordinary skill in the art may understand that various modifications and other equivalent embodiments may be made.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A beam expander comprising:
   a first optical element;
   a second optical element spaced apart from the first optical element; and
   a waveguide connecting the first optical element and the second optical element;
   wherein the first optical element exits a light having a first cross-sectional shape, and
   wherein the waveguide is configured to gradually transform the light having the first cross-sectional shape from the first optical element into light having a second cross-sectional shape different from and smaller than the first cross-sectional shape through total internal reflection, and to direct the transformed light to the second optical element.

2. The beam expander of claim 1, further comprising:
   a light diffuser diffusing incident light to in-couple the diffused light to the first optical element,
   wherein an intensity of the light diffused by the light diffuser has a greater uniformity over a light cross section than an intensity of the incident light.

3. The beam expander of claim 2, wherein the light diffuser outputs the incident light as a plurality of sub-lights that are spatially separated from each other.

4. The beam expander of claim 2, wherein the light diffuser modulates a phase of the incident light and outputs the incident light as a plurality of sub-lights.

5. The beam expander of claim 2, wherein the light diffuser performs spatial non-uniformity phase modulation on the incident light and outputs a plurality of sub-lights.

6. The beam expander of claim 2, wherein the light diffuser comprises at least one of a microlens raster, a phase mask, a matte diffuser, a diffractive optical element, and a holographic optical element.

7. The beam expander of claim 2, wherein the incident light has an optical cross-sectional profile of at least one of a Gaussian beam, a multimode beam, a cylindrical beam, a super-Gaussian beam, and a Laguerre-Gaussian beam.

8. The beam expander of claim 2, wherein the light diffuser and the first optical element are arranged to overlap each other in a direction perpendicular to a length direction of the waveguide.

9. The beam expander of claim 2,
   wherein the light diffuser is arranged on a first surface of the waveguide, and
   wherein the first optical element is arranged on a second surface opposite to the first surface of the waveguide.

10. The beam expander of claim 2, wherein the light diffuser is integrated with the first optical element.

11. The beam expander of claim 2, wherein a uniformity of an intensity of the light out-coupled by the second optical element is greater than a uniformity of an intensity of the light incident on the light diffuser.

12. The beam expander of claim 1, wherein the second cross-sectional shape is a polygonal shape.

13. The beam expander of claim 1, wherein the first cross-sectional shape is a circle or an ellipse.

14. The beam expander of claim 1, wherein at least one of the first optical element and the second optical element comprises at least one of a diffractive optical element and a holographic optical element.

15. The beam expander of claim 1, further comprising a laser diode that provides light.

16. The beam expander of claim 1, wherein the second optical element collimates, at a divergence or convergence angle of less than 0.25°, light incident on the second optical element.

17. An electronic apparatus comprising:
    a light source providing a light;
    a first optical element in-coupling the light to exit a light having a first cross-sectional shape by using the in-coupled light;
    a second optical element spaced apart from the first optical element; and
    a waveguide connecting the first optical element and the second optical element,
    wherein the waveguide is configured to gradually transform the light having the first cross-sectional shape from the first optical element into light having a second cross-sectional shape different from and smaller than the first cross-sectional shape through total internal reflection, and to direct the transformed light to the second optical element.

18. The electronic apparatus of claim 17, further comprising:
    a light diffuser diffusing the light provided from the light source to in-couple the diffused light to the first optical element.

19. The electronic apparatus of claim 17, wherein the second optical element out-couples the transformed light to illuminate one of a redirector, a screen, a liquid crystal display (LCD) panel, or imaging matrices.

20. The electronic apparatus of claim 17, wherein the electronic apparatus is one of a helmet-mounted display device, an indicator on a vehicle windshield, and a fingerprint scanner.

* * * * *